(12) United States Patent
Inoue et al.

(10) Patent No.: US 7,419,295 B2
(45) Date of Patent: Sep. 2, 2008

(54) EXTRUDER

(75) Inventors: Kimio Inoue, Takasago (JP); Shigehiro Kasai, Takasago (JP); Hideo Funahashi, Takasago (JP); Kazuhisa Fujisawa, Kobe (JP); Hironobu Nakanishi, Kobe (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 467 days.

(21) Appl. No.: 11/149,198

(22) Filed: Jun. 10, 2005

(65) Prior Publication Data

US 2006/0003042 A1    Jan. 5, 2006

(30) Foreign Application Priority Data

Jun. 21, 2004    (JP)    ............................. 2004-182905

(51) Int. Cl.
  *B29B 7/48*    (2006.01)
  *B29B 7/84*    (2006.01)
(52) U.S. Cl. ................. 366/75; 366/85; 366/88
(58) Field of Classification Search ................. 366/75, 366/76.1, 76.2, 76.3, 76.4, 76.6, 76.9, 76.93, 366/79–80, 83–86, 88–90; 425/203, 204, 425/208, 209
See application file for complete search history.

(56) References Cited

U.S. PATENT DOCUMENTS 3,917,507 A * 11/1975 Skidmore ................. 159/2.2
3,985,348 A * 10/1976 Skidmore ................. 366/75
4,029,300 A *  6/1977 Morishima et al. ........ 366/75
4,491,417 A *  1/1985 Hold et al. ................ 366/75
4,902,455 A *  2/1990 Wobbe ..................... 264/40.7
5,851,065 A * 12/1998 Ikeda et al. ............... 366/76.6
6,682,213 B2    1/2004 Inoue et al.
2002/0093118 A1* 7/2002 Inoue et al. ............ 264/211.23
2002/0186612 A1  12/2002 Murakami et al.
2006/0003042 A1*  1/2006 Inoue et al. ............. 425/204

FOREIGN PATENT DOCUMENTS

CN          2048820 U       12/1989
DE          0465773 A2 *    1/1992
JP          2002-210731     7/2002
WO          WO 03/020483 A1 3/2003

\* cited by examiner

*Primary Examiner*—Charles E Cooley
(74) *Attorney, Agent, or Firm*—Oblon, Spivak, McClelland, Maier & Neustadt, P.C.

(57) ABSTRACT

An extruder includes a barrel and a kneading screw extending through the barrel in a rotatable fashion. The kneading screw is provided with a devolatilization portion. The devolatilization portion includes a kneading flight that is twisted in a direction for transferring a material downstream. The kneading flight kneads the material while transferring the material downstream and separates a volatile component from the material. Impregnation sections, which allow the kneading chamber to be impregnated with the material, are respectively disposed adjacent to an upstream side and a downstream side of the devolatilization portion so that the air-tightness of the devolatilization portion of the extruder is maintained. Accordingly, an efficient devolatilization operation of the material is achieved.

10 Claims, 5 Drawing Sheets

EXTRUDER

BACKGROUND OF THE INVENTION

1. Field of the Invention

The present invention relates to an extruder suitably used for devolatilizing a material, such as plastic and rubber, in order to efficiently remove volatile components contained in the material.

2. Description of the Related Art

Generally, a composite resin material, such as a plastic compound, is manufactured by injecting a polymeric resin material and a powdery additive into a barrel of a continuous kneading unit, and then extruding the two downstream while they are kneaded with a kneading screw extending through the barrel. Furthermore, a granulator, for example, is disposed adjacent to the downstream side of the continuous kneading unit, such that the granulator forms the composite resin material into pellets.

A typical continuous kneading unit may either be a single kneading-screw type or a twin kneading-screw type.

A twin-screw continuous kneading unit includes a barrel having therein a pair of left and right kneading chambers which communicate with each other; a pair of left and right kneading screws extending through the two respective kneading chambers in a rotatable fashion; and supply means connected to an upstream portion of the barrel for injecting a material into the kneading chambers.

Each of the kneading screws includes screw segments for transferring the material downstream, and rotor segments and kneading segments that knead the material while applying a large shearing force to the material. These segments are connected to each other in an axial direction of the kneading screw.

For example, a twin-screw continuous kneading unit disclosed in Japanese Unexamined Patent Application Publication No. 2002-210731 has the structure described above, and is provided with a vacuum suction hole (vacuum vent) for forcibly removing volatile constituents and water from a material for the purpose of component adjustment. A gas suction operation through the vacuum vent creates a negative-pressure state in the kneading chambers, thereby enhancing devolatilization of the material and forcing the volatile components to be emitted outward through the vacuum vent.

Twin-screw continuous kneading units that are equipped with a material-extruding function are generally called twin-screw extruders.

According to Japanese Unexamined Patent Application Publication No. 2002-210731, however, the negative-pressure state generated in the kneading chambers in response to the gas suction through the vacuum vent extends only within a region in which the screw segments for transferring the material to be kneaded downstream are provided. This is problematic in that there are cases where the material is not sufficiently devolatilized.

SUMMARY OF THE INVENTION

Accordingly, it is an object of the present invention to provide an extruder that can perform an efficient devolatilization operation on a material.

In order to achieve the above-mentioned object, the present invention provides an extruder as described below.

Specifically, an extruder according to the present invention includes a barrel having a kneading chamber therein; a kneading screw comprising plural segments, said kneading screw extending through said kneading chamber in a rotatable fashion, said kneading screw being rotated so as to knead a material and to transfer the material from an upstream side of the extruder towards a downstream side of the extruder; a devolatilization segment section in said kneading screw, said devolatilization segment section being provided with a kneading flight twisted around said devolatilization segment section so as to transfer the material downstream, said kneading flight kneading the material while transferring the material downstream and separating a volatile component from the material; a feeding section disposed adjacent to a downstream side of said devolatilization segment section, said feeding section including a screw segment; a vacuum suction hole at a position corresponding to a position of said barrel where the feeding section is disposed, said vacuum suction hole communicating with a portion of said kneading chamber through which said devolatilization segment section extends; and impregnation sections disposed adjacent to an upstream side of said devolatilization segment section and to a downstream side of said feeding section, said impregnation sections being provided for impregnating said kneading chamber with the material.

Accordingly, since the devolatilization segment section kneads the material while devolatilizing the material, the devolatilization operation can be performed efficiently.

Furthermore, since the devolatilization segment section of the kneading screw is pressure-sealed by the impregnation sections disposed adjacent to the upstream side of the devolatilization section and to the downstream side of the devolatilization segment section, the negative-pressure state for the devolatilization section can be properly maintained. Therefore, the volatile component evaporating from the material is properly released outward through the vacuum suction hole communicating with the devolatilization segment section. Accordingly, this further improves the efficiency of the devolatilization operation of the material.

In other words, according to the present invention, a portion of the kneading chamber in which the air-tightness is maintained by the impregnation sections contains the devolatilization segment section, and the devolatilization segment section is provided with a kneading flight twisted around the devolatilization section in a direction for transferring the material downstream. Thus, the kneading flight of the devolatilization segment section kneads the material while transferring the material downstream and also performs a surface-renewal operation of the material. As a result of this surface renewal operation, the separation of the volatile component is enhanced.

Moreover, due to the fact that the devolatilization segment section is not provided with a flight that is twisted in the reverse direction, the devolatilization segment section itself does not have an impregnation section of the material. Thus, a negative-pressure state can extend over a wide range (long range) of the kneading chamber. Consequently, the region to be used for the devolatilization of the material by the surface-renewal operation can be used to the maximum extent as a negative-pressure region for vacuum suction, whereby an efficient devolatilization operation can be achieved.

Furthermore, in the extruder described above, L/D is preferably equal to 2 or more, D indicating a diameter of the kneading chamber and L indicating a length of the devolatilization segment section in a rotational-axis direction of the kneading screw. Consequently, this contributes to further improvement in the efficiency of the devolatilization operation. Accordingly, due to the fact that the devolatilization operation is performed in the devolatilization segment section having a kneading function and occupying a relatively large proportion of the kneading screw, the devolatilization operation can be performed efficiently.

Furthermore, L/D is more preferably equal to 10 or more. This contributes not only to an improvement in the devolatilization process, but also to a dispersal effect of additives in the material to be kneaded.

Furthermore, each impregnation section preferably has a resistive element disposed adjacent to a downstream side of the impregnation section such that the resistive element applies a resistive force against a flow of the material being transferred downstream. In this case, the resistive elements may force the corresponding impregnation sections to be impregnated with the material so that the air-tightness can be maintained.

Furthermore, one of the resistive elements preferably includes a segment having a flight twisted in a direction for pushing the material upstream.

Because the flight of the segment (screw segment or rotor segment) included in the resistive elements is twisted in a reverse-spiral fashion for pushing the material upstream, the material transferred from the upstream side accumulates in this section. Accordingly, the impregnation section having a high impregnation rate of the material is formed adjacent to the upstream side of the resistive element, whereby the front and rear spaces (upstream and downstream spaces) of the impregnation section are securely blocked from each other with pressure. Thus, the devolatilization segment section adjacent to the impregnation section is properly sealed.

Furthermore, the resistive elements preferably include a discharging member which discharges the material outward and generates a flow-path resistance when the material flows into the discharging member.

Accordingly, the material transferred from the upstream side receives a flow-path resistance in the discharging member, such as a die, an orifice, a transfer pipe, or a filtration unit having a high flow-path resistance, whereby the impregnation section is formed adjacent to the upstream side of the discharging member. Thus, the front and rear spaces (upstream and downstream spaces) of the impregnation section are securely blocked from each other with pressure, whereby the devolatilization segment section adjacent to the impregnation section is properly sealed.

Furthermore, the devolatilization segment section preferably includes a double-blade rotor segment including a pair of kneading flights which is projected in opposite directions from each other with respect to a diameter direction of the kneading screw. Furthermore, each of the kneading flights is preferably provided with a low tip and a high tip for facilitating the separation of the volatile component, the low tip having a large tip clearance with respect to an inner surface of at least one kneading chamber so as to enable a thin-film formation of the material on the inner surface, the high tip having a small tip clearance with respect to the inner surface of at least one kneading chamber so that the thin film of the material is scraped off the inner surface by the high tip.

Accordingly, the low tip in each double-blade rotor segment allows a thin film of the material to be formed on the inner surface of at least one kneading chamber. On the other hand, the thin film is scraped off the inner surface by the high tip in each double-blade rotor segment. Thus, the surface-renewal operation of the material is performed repetitively so as to contribute to further improvement in the efficiency of the devolatilization operation.

Furthermore, the kneading chamber preferably includes a pair of kneading chambers communicating with each other within the barrel. Moreover, a pair of kneading screws respectively extends through the pair of kneading chambers in a rotatable fashion, the kneading screws being rotatable in the same direction and being meshed with each other.

Furthermore, the double-blade rotor segments in the devolatilization segment section are connected in a continuous manner such that side surfaces of the kneading flights of the adjacent rotor segments with respect to an axial direction of said kneading screw do not have a step therebetween.

Accordingly, the kneading flights of the adjacent rotor segments are connected such that they do not have a step therebetween, and grooves formed between the adjacent kneading flights extend continuously in the axial direction. Thus, the entire devolatilization segment section forms a smooth spiral. Since the grooves provided in the devolatilization segment section communicate with the vacuum suction hole, the volatile component evaporating from the material flows through a flow path defined by the grooves and is properly sucked into the vacuum suction hole so as to be released outward.

Furthermore, a twist angle of each kneading flight of the double-blade rotor segment is preferably set greater than 0° and equal to or smaller than 60° with respect to an axial direction of the kneading screw.

According to this structure, since the spiral of the devolatilization segment section is moderate with respect to its center core, the overall length of each of the grooves is reduced, meaning that the distance from the devolatilization segment section to the vacuum suction hole can be made shorter. As a result, the flow-path resistance of the grooves is reduced, thereby allowing the volatile component to flow easily to the vacuum suction hole.

According to the present invention, an extruder that can perform an efficient devolatilization operation on a material is achieved.

DESCRIPTION OF THE PREFERRED EMBODIMENTS

Embodiments of an extruder according to the present invention will now be described.

FIGS. 1 to 4 illustrate a twin screw extruder 1 according to the present invention. The extruder 1 includes a pair of left and right kneading screws 2, 2 which rotate in the same direction and are meshed with each other; and a barrel 3 which rotatably supports the kneading screws 2, 2. The barrel 3 includes a plurality of barrel segments 4 which are connected to each other in an axial direction of the barrel 3.

In the description below, the right side of FIG. 1 will be referred to as an upstream side or a front side, whereas the left side of FIG. 1 will be referred to as a downstream side or a rear side.

Figure 2:
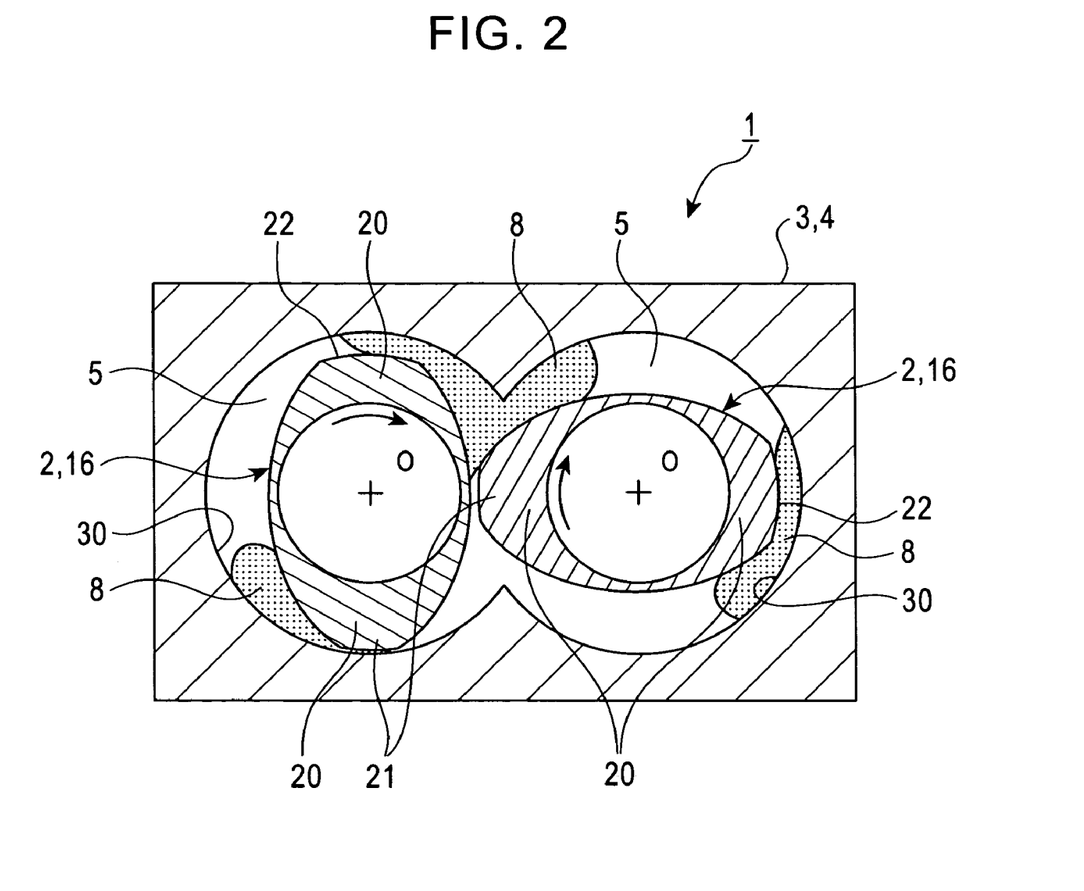
FIG. 2 is a cross-sectional view of a devolatilization portion shown in FIG. 1.

The barrel 3 has a pair of left and right kneading chambers 5, 5 extending through the inside of the barrel 3 from the upstream side towards the downstream side in the axial direction of the barrel 3. Referring to FIG. 2, each kneading chamber 5 is substantially circular in cross section. In cross section, side portions of the two kneading chambers 5, 5 communicate with each other at the central portion of the barrel 3 so that the two kneading chambers 5, 5 form a spectacle-like through hole.

The upstream side of the barrel 3 is provided with a material supply hole 6. A material 8 to be kneaded is injected into the kneading chambers 5, 5 through a hopper 7 connected with the supply hole 6. The barrel 3 disposed on the downstream side of the hopper 7 is provided with an electric heater or a heating unit that applies heated oil (not shown) in order to melt the injected material 8. Thus, the material 8 is conveyed through the barrel 3 while simultaneously being melted by the heated barrel 3.

The downstream side of the barrel 3 is provided with a vacuum suction hole (vacuum vent) 10 which reduces the pressure in the kneading chambers 5, 5 by vacuuming in order to remove volatile constituents and water (which will be referred to as volatile components hereinafter) from the material 8. In other words, the vacuum suction hole 10 functions as a devolatilizer. Moreover, the downstream-most portion of the barrel 3 is provided with a discharging member 35 for discharging the material 8 from the barrel 3. The discharging member 35 according to the present invention is disposed at a position just after the point where the kneaded material 8 in the barrel 3 is released from the kneading chambers 5, 5. The discharging member 35 may be a die, an orifice, a transfer pipe, or a filtration unit, and has a large flow-path resistance with respect to the flow of the kneaded material 8 so as to function as a second resistive section, which will be described below in detail.

Intermediate portions of the barrel 3 are provided with a plurality of plugs 11 used for various purposes. In sections that are not subject to vacuum devolatilization, the corresponding plugs 11 may be removed so that these sections can function as open vents that facilitate the devolatilization process by allowing the inside of the kneading chambers 5, 5 to communicate with the atmosphere. Alternatively, by removing the plugs 11, the kneading chambers 5, 5 may be connected to supply means for injecting, for example, additives into the kneading chambers 5, 5.

The kneading screws 2, 2 are meshed with each other and extend through the kneading chambers 5, 5 of the barrel 3 in a rotatable fashion. The kneading screws 2, 2 rotate in the same direction so as to transfer the material 8 from the upstream side to the downstream side while kneading the material 8.

Each of the kneading screws 2, 2 includes a plurality of segments connected to each other in the axial direction. The plurality of segments in each kneading screw 2 includes double-blade screw segments 13 for transferring and extruding the material 8 towards the downstream side; double-blade rotor segments 14 for kneading the material 8 in order to perform mixing and dispersing processes; and double-blade kneading disc segments 15 provided mainly for mixing the material 8.

Figure 1:
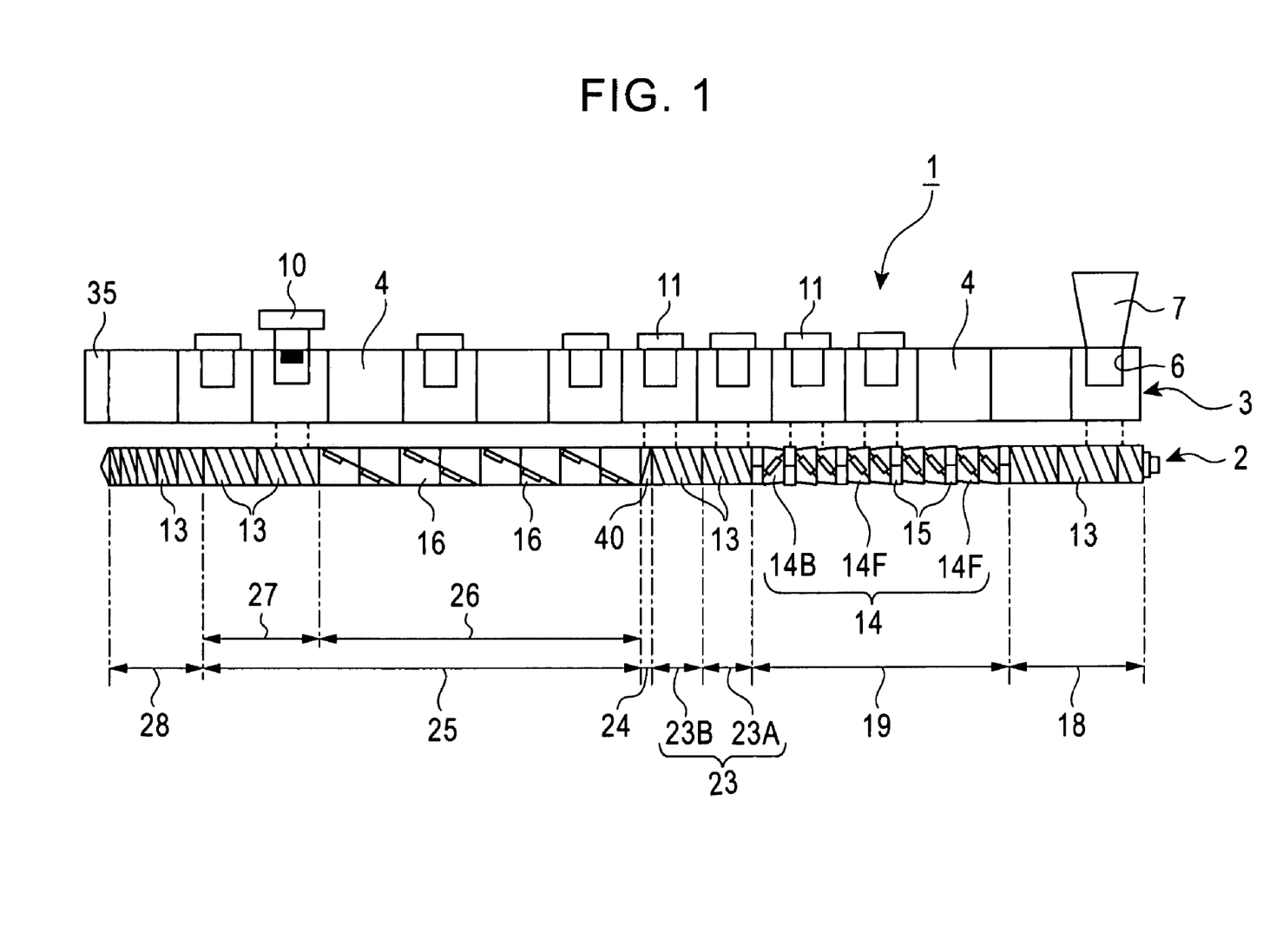
FIG. 1 is a schematic diagram of a twin screw extruder according to the present invention.

Referring to FIG. 1, from the upstream side towards the downstream side, each kneading screw 2 has a first feeding section 18, a first kneading section 19, a second feeding section 23, a first resistive section 24, a devolatilization portion 25, a second impregnation section 28, and a second resistive section 35. The first resistive section 24 and the second resistive section 35 function as resistive elements that apply a resistive force against the material 8 flowing towards the downstream side in order to impregnate the upstream side and the downstream side of the devolatilization portion 25 with the material 8. Due to the retardation of the flow of the material 8 by these resistive elements, impregnation sections of the material 8 are formed. As a result of these impregnation sections, the air-tightness of the devolatilization portion 25 is maintained.

In detail, the upstream-most section of each kneading screw 2 is defined by the first feeding section 18 which includes the corresponding screw segments 13 linked with each other in the axial direction. Each screw segment 13 has a pair of flights projected from opposite sides of an axis of rotation O with respect to a diameter direction of the screw segment 13. Moreover, the flights twist around the screw segment 13 in a spiral fashion in the axial direction, such that a tip clearance (gap) between each flight and an inner surface 30 of the corresponding kneading chamber 5 is extremely small.

The first feeding sections 18 have a function for transferring the material 8 towards the downstream side through grooves 29 formed between the flights of the screw segments 13, but substantially do not have a function for kneading the material 8.

On the other hand, the first kneading section 19 is disposed adjacent to the downstream side of the corresponding first feeding section 18, and includes a combination of the kneading disc segments 15 and the rotor segments 14.

The kneading disc segments 15 include a plurality of flat kneading discs that are bonded to each other. The kneading discs are provided with double-blade type flights, which have the same cross section as those of the screw segments 13 and have an extremely small tip clearance with respect to the inner surface 30 of the corresponding kneading chamber 5. The flights extend parallel to the axial direction. Consequently, the material 8 passing over each kneading disc segment 15 receives a large shearing force when passing through the tip clearance, whereby the material 8 is kneaded.

Figure 3A:
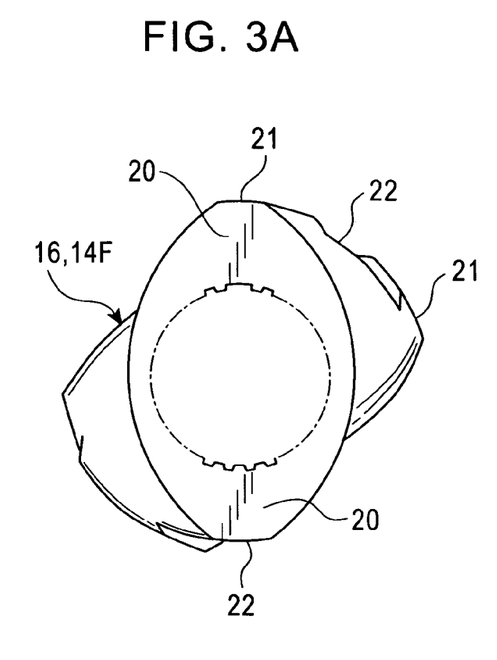
FIGS. 3A and 3B respectively illustrate a front view of one of rotor segments and a right side view of the rotor segment.
Figure 3B:
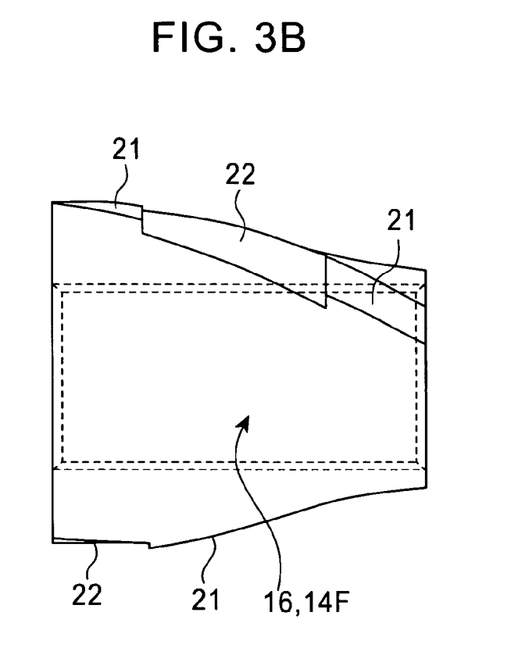

On the other hand, the rotor segments 14 include feeding segments 14F and a reversing segment 14B. Referring to FIGS. 3A and 3B, each feeding segment 14F has a pair of flights 20 twisted around the feeding segment 14F in a spiral manner with respect to the axial direction in order to allow the material 8 to be transferred downstream.

The reversing segment 14B also has a pair of flights 20 twisted in a spiral fashion in a direction opposite to the direction in which the flights 20 of the feeding segments 14F are twisted. Thus, the reversing segments 14B knead the material 8 while pushing the material 8 backward towards the upstream side. Accordingly, this allows the impregnation rate of the material 8 in the kneading chambers 5, 5 to increase, thereby achieving a higher degree of kneading.

Referring to FIGS. 3A and 3B, the flights 20 of each rotor segment 14 have high tips 21 having a small tip clearance, and low tips 22 having a large tip clearance. The high tips 21 and the low tips 22 of the rotor segments 14 are alternately arranged in the axial direction. When the kneading screws 2, 2 are rotated and the material 8 passes through the tip clearance of each high tip 21, a large shearing force is applied to the material 8. Due to this shearing force, a surface layer of the material 8 adhered to the inner surfaces 30 of the kneading chambers 5, 5 is scraped off.

The degree of projection of each low tip 22 with respect to the diameter direction of the corresponding kneading screw 2 is smaller than each high tip 21, meaning that each low tip 22 has a tip clearance larger than that of each high tip 21. Accordingly, when the kneading screws 2, 2 are rotated, a smaller shearing force is applied to the material 8 passing through the tip clearance of each of the low tips 22. This increases the amount of material 8 passing over the low tips 22 so as to facilitate the flow of the material 8 in the kneading chambers 5, 5, whereby a higher degree of kneading is achieved.

The twist angle of the flights 20 of each feeding segment 14F is set at about 30° with respect to the axial direction, whereas the twist angle of the flights 20 of each reversing segment 14B is set at about −30°.

The rotor segments 14 included in the first kneading section 19 may be connected in a manner such that the adjacent segments are joined in a discontinuous fashion, as shown in FIG. 1. Alternatively, the adjacent segments may be joined in a continuous fashion without having a step therebetween. As a further alternative, the first kneading section 19 of each kneading screw 2 may additionally be provided with a neutral segment 14N.

The second feeding section 23 is disposed adjacent to the downstream side of the first kneading section 19.

Substantially similar to the first feeding section 18, the second feeding section 23 includes the corresponding screw segments 13. The second feeding section 23 has an upstream sub-section 23A which has a function substantially similar to the screw segments 13.

The second feeding section 23 also has a downstream sub-section 23B. The downstream sub-section 23B has the first resistive section 24 disposed adjacent thereto.

The first resistive section 24 of each kneading screw 2 includes a single screw segment 40 that enables the material 8 to be pushed upstream. Specifically, the flights 20 of this screw segment 40 are twisted in the reverse direction so as to allow the material 8 to be pushed upstream. Accordingly, the first resistive section 24 functions as a resistive element that applies a resistive force against the flow of the material 8. In other words, due to the resistive force of the first resistive section 24 against the flow of the material 8, the material 8 transferred from the upstream side accumulates in the downstream sub-section 23B. Thus, the downstream sub-section 23B functions as a first impregnation section of the material 8. As a result, the first impregnation section (downstream sub-section) 23B ensures that an upstream space and a downstream space are blocked from each other, whereby the devolatilization portion 25 is prevented from communicating with the upstream space.

The devolatilization portion 25 of each kneading screw 2 is disposed adjacent to the downstream side of the first resistive section 24.

The devolatilization portion 25 allows the volatile components contained in the material 8 to evaporate and to be released from the barrel 3. Due to this devolatilization operation, the component adjustment of the material 8 is performed. The devolatilization portion 25 according to the first embodiment includes a devolatilization segment section 26 disposed proximate an upstream side thereof, and a third feeding section 27 disposed proximate a downstream side thereof.

Figure 4:
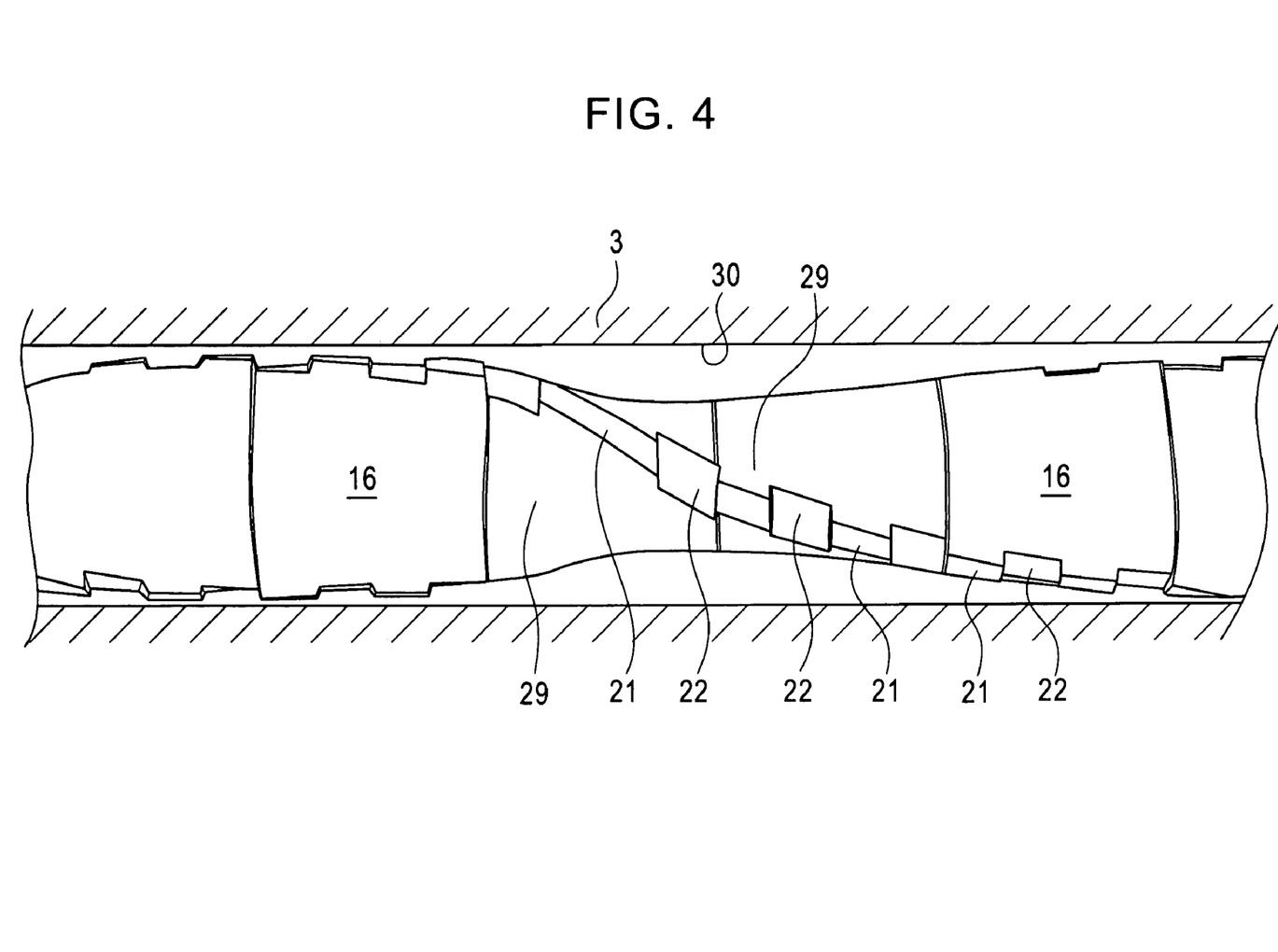
FIG. 4 is a side view of the devolatilization portion shown in FIG. 1.

The devolatilization segment section 26 includes a group of double-blade rotor segments 16 each provided with a pair of flights 20 projected in opposite directions from each other in the diameter direction of the corresponding kneading screw 2. The double-blade rotor segments 16 substantially have the same shape as the feeding segments 14F included in the first kneading section 19, and have a function for kneading the material 8. Referring to FIG. 4, the double-blade rotor segments 16 are connected in a continuous manner such that the adjacent segments in the axial direction do not have a step therebetween. Accordingly, the adjacent flights 20 in the axial direction and the grooves 29 formed between the flights 20 extend continuously, such that the entire devolatilization segment section 26 forms a screw structure with smooth surfaces.

The devolatilization segment section 26 does not have flights for pushing the material 8 upstream, but has the rotor segments 16 provided with the flights 20 for transferring the material 8 downstream while kneading the material 8. Consequently, this facilitates the separation of the volatile components in response to a surface renewal of the material 8 during the kneading process. On the other hand, since the material 8 does not accumulate due to the fact that the material 8 is not pushed backwards, a wide range (long range) of the kneading chambers 5, 5 that corresponds to the devolatilization segment sections 26 can be used as a negative-pressure region via the vacuum suction hole (vacuum vent) 10.

The flights 20 of each rotor segment 16 are provided with the low tips 22 having a large tip clearance with respect to the corresponding kneading chamber 5 so as to enable thin-film formation of the material 8, and the high tips 21 having a small tip clearance with respect to the corresponding kneading chamber 5 so as to enable scraping of the thin film. According to the thin-film formation and the scraping of the material 8, the devolatilization of the material 8 can further be enhanced. Referring to FIGS. 3A and 3B, in a case where front and rear side portions of one of the flights 20 are respectively provided with two high tips 21 and the intermediate portion of the flight 20 is provided with one low tip 22, the other flight 20 has two low tips 22 at its front and rear side portions and one high tip 21 at its intermediate portion. Accordingly, the devolatilization segment section 26 has a structure in which the tips change alternately with respect to the axial direction and the circumferential direction. In each kneading screw 2, the shapes of the high tips 21 and the low tips 22 of the rotor segments 16 are substantially the same as those of the feeding segments 14F in the first kneading section 19.

When the kneading screws 2, 2 are rotated, the flights 20 of the double-blade rotor segments 16 change alternately in the circumferential direction and the axial direction in the following manner: small tip clearance→large tip clearance→small tip clearance and so on.

The twist angle of the flights 20 of the double-blade rotor segments 16 is set greater than 0° and equal to or smaller than 60° with respect to the axial direction of the kneading screws 2, 2. The term "twist angle" refers to a tilt angle of the top of each flight 20 with respect to the axial direction, that is, an angle of the top of each flight 20 tilted with respect to the axial direction in the extended state of the corresponding double-blade rotor segment 16. Accordingly, the spiral of the devolatilization segment section 26 is moderate with respect to the center core thereof, and moreover, the grooves 29 also form a moderate spiral. The overall length of the flow path defined by the grooves 29 in the devolatilization segment section 26 is shorter than that in the screw segments 13. Therefore, the flow-path resistance from the devolatilization segment section 26 to the vacuum suction hole 10 is small.

As the twist angle approaches 0°, the transferring capability of the material 8 lowers, whereas the shearing force applied to the material 8 increases. For this reason, the twist angle of each flight 20 is most preferably set within a range of 15° to 45° so that an appropriate shearing force can be applied to the material 8.

The third feeding section 27 included in the devolatilization portion 25 is disposed adjacent to the downstream side of the devolatilization segment section 26. The third feeding section 27 has substantially the same structure as the first feeding section 18, and has a function for transferring the material 8 downstream.

According to the present embodiment, one of the barrel segments 4 corresponding to the upstream-most portion of the third feeding section 27 adjacent to the downstream-most portion of the devolatilization segment section 26 is provided with the vacuum suction hole (vacuum vent) 10.

The pressure for the devolatilization portion 25 is reduced via the vacuum vent 10 so that a devolatilization process of the material 8 is performed. The grooves 29 defined by the side surfaces of the flights 20 of the devolatilization segment sections 26 and the inner surfaces 30 communicate with the vacuum vent 10 so that the volatile components evaporating from the material 8 flow into the vacuum vent 10 via the flow path formed by the grooves 29. Thus, the volatile components are released from the barrel 3. As described previously, since the flow path of the grooves 29 in the devolatilization segment section 26 of each kneading screw 2 has a short overall length and is smooth, the devolatilization segment section 26 has a smaller flow-path resistance against the flow of the volatile components in comparison with screw segments having the same L/D (L indicating the length of each devolatilization segment section 26 and D indicating the diameter of the corresponding kneading chamber 5). Thus, the devolatilization effect due to the pressure reduction via the vacuum vent 10 extends over the entire devolatilization segment section 26.

The second impregnation section 28 of each kneading screw 2 is disposed adjacent to the downstream side of the third feeding section 27.

The second impregnation section 28 includes a group of screw segments 13 arranged in a manner such that the flight pitch is narrower towards the downstream side. Specifically, referring to FIG. 1, four screw segments 13 having different flight pitches are arranged from the upstream side to the downstream side of the second impregnation section 28. The upstream-most screw segment 13 has substantially the same flight pitch as the screw segments 13 included in the third feeding section 27. On the other hand, the flight pitches of the three remaining screw segments 13 become narrower sequentially towards the downstream side of the second impregnation section 28.

Furthermore, the discharging member 35 defined by a die and functioning as a resistive element is concentrically disposed at the downstream-most portion of the barrel 3. Since the kneaded material 8 is extruded outward against the flow-path resistance of the discharging member 35, the kneaded material 8 thickens at the second impregnation section 28. The second impregnation section 28 functions as an isolator for properly separating the devolatilization portion 25 disposed adjacent thereto from the region further downstream of the devolatilization portion 25.

Accordingly, due to the devolatilization segment sections 26 having a function for kneading the material 8 and including the rotor segments 16 provided with the flights 20 that twist in the direction for transferring the material 8 downstream while preventing the impregnation of the material 8, the surface renewal process of the material 8 can be utilized effectively as the separation process of the volatile components. At the same time, a wide range (long range) of the kneading chambers 5, 5 that corresponds to the devolatilization sections 26 can be used as a negative-pressure region for vacuum suction.

As described above, in each kneading screw 2, the first resistive section (resistive element) 24 is provided adjacent to the upstream side of the devolatilization portion 25, and the second resistive section (resistive element) 35 is provided adjacent to the downstream side. Since the first impregnation section (downstream sub-section) 23B and the second impregnation section 28 are respectively disposed adjacent to the upstream sides of the first resistive section 24 and the second resistive section 35, the air-tightness of the devolatilization portion 25 is maintained, whereby the negative-pressure state for the devolatilization portion 25 can be properly maintained. Accordingly, this facilitates the evaporation of, for example, water from the material 8, and moreover, allows the volatile components to be effectively released outward via the vacuum vent 10.

The flights 20 of the devolatilization segment sections 26 are provided with the low tips 22 and the high tips 21 so as to enable thin-film formation of the material 8 on the inner surfaces 30 of the kneading chambers 5, 5 and to enable scraping of the thin film. Accordingly, in comparison with a case where common kneading flights are used, the surface renewal operation can be utilized in a more effective manner.

Furthermore, according to the present embodiment, the length of the devolatilization portion 25 including the devolatilization segment section 26 and the third feeding section 27 is relatively large, namely, L/D=16 (L indicating the length of each devolatilization portion 25 and D indicating the diameter of the corresponding kneading chamber 5).

The operation of the twin screw extruder 1 according to the present embodiment will now be described.

In order to manufacture a composite resin material, such as a plastic compound, using the twin screw extruder 1, the material 8 composed of, for example, synthetic-resin pellets is first injected into the barrel 3 through the hopper 7. The material 8 is then heated by a heating unit 9 (not shown) while being transferred downstream via the first feeding sections 18. Subsequently, the material 8 is kneaded and melted in the first kneading sections 19.

When the kneading process is being performed by the rotor segments 14 of the first kneading sections 19, the material 8 passes through the large tip clearance of the low tips 22. This enhances the kneading process of additives into the material 8. On the other hand, even when the material 8 adheres to the inner surfaces 30 of the kneading chambers 5, 5 due to the low tips 22, the high tips 21 scrape off the material 8 from the inner surfaces 30 of the kneading chambers 5, 5. Thus, the kneading effect for the additives is enhanced, and the reduction of the effective-diameter caused by multilayer adhesion of the material 8 is prevented.

When the kneading process by the first kneading sections 19 is finished, the material 8 is transferred downstream through the second feeding sections 23 so as to be introduced to the devolatilization portions 25. In the devolatilization portions 25, the kneading chambers 5, 5 are in a negative-pressure state due to the vacuum vent 10. The material 8 is kneaded in the devolatilization segment sections 26 while the surface thereof is renewed, and is forcibly devolatilized (degassed and dehydrated).

Moreover, when the material 8 passes through the tip clearance of the low tips 22 of the devolatilization segment sections 26, a thin film of the material 8 forms on the inner surfaces 30 of the kneading chambers 5, 5. On the other hand, the high tips 21 scrape off the thin film from the inner surfaces 30. Thus, a surface renewal operation of the material 8 is constantly performed at a higher level. Accordingly, this enhances the evaporation of volatile constituents and water from the top surface of the thin film.

On the other hand, since a large shearing force is applied to the material 8 when the material 8 passes through the high tips 21, a flocculating agent, such as a bulking agent and an additive agent, contained in the material 8 or polymer gel contained in the material 8, for example, can be effectively diffused and mixed thoroughly in the composite resin material. In other words, the devolatilization segment sections 26 allow for devolatilization and drying processes of the kneaded material 8 as well as diffusion and mixing processes of, for example, a bulking agent and polymer gel.

On the other hand, the grooves 29 in the devolatilization segment sections 26 function as a flow path for allowing the evaporating volatile components to flow into the vacuum vent 10. Since the distance of the flow path to the vacuum vent 10 is extremely short in comparison with a case where the devolatilization segment sections 26 are formed of screw segments 13 with the same L/D, a vacuum region is formed over a wide range of the devolatilization segment sections 26. Moreover, due to the fact that the flow-path resistance is small, the volatile components can easily flow towards the vacuum vent 10.

The negative-pressure state due to the suction force from the vacuum vent 10 extends over the material 8 transferred to the third feeding sections 27, such that the devolatilization process is also performed in the sections 27.

In the first impregnation sections 23B disposed adjacent to the upstream side of the devolatilization portions 25, the material 8 is in an accumulated state due to the reverse spiral of the first resistive sections 24. On the other hand, in the second impregnation sections 28 disposed adjacent to the downstream side of the devolatilization portions 25, the material 8 is in an accumulated state due to the flow-path resistance of the die 35. Accordingly, both front and rear sides (upstream and downstream sides) of the devolatilization portions 25 are constantly in a hermetically-sealed state, whereby the negative-pressure state for the devolatilization portions 25 is properly maintained.

Finally, the devolatilized material 8 is extruded outward through the die 35.

Figure 5:
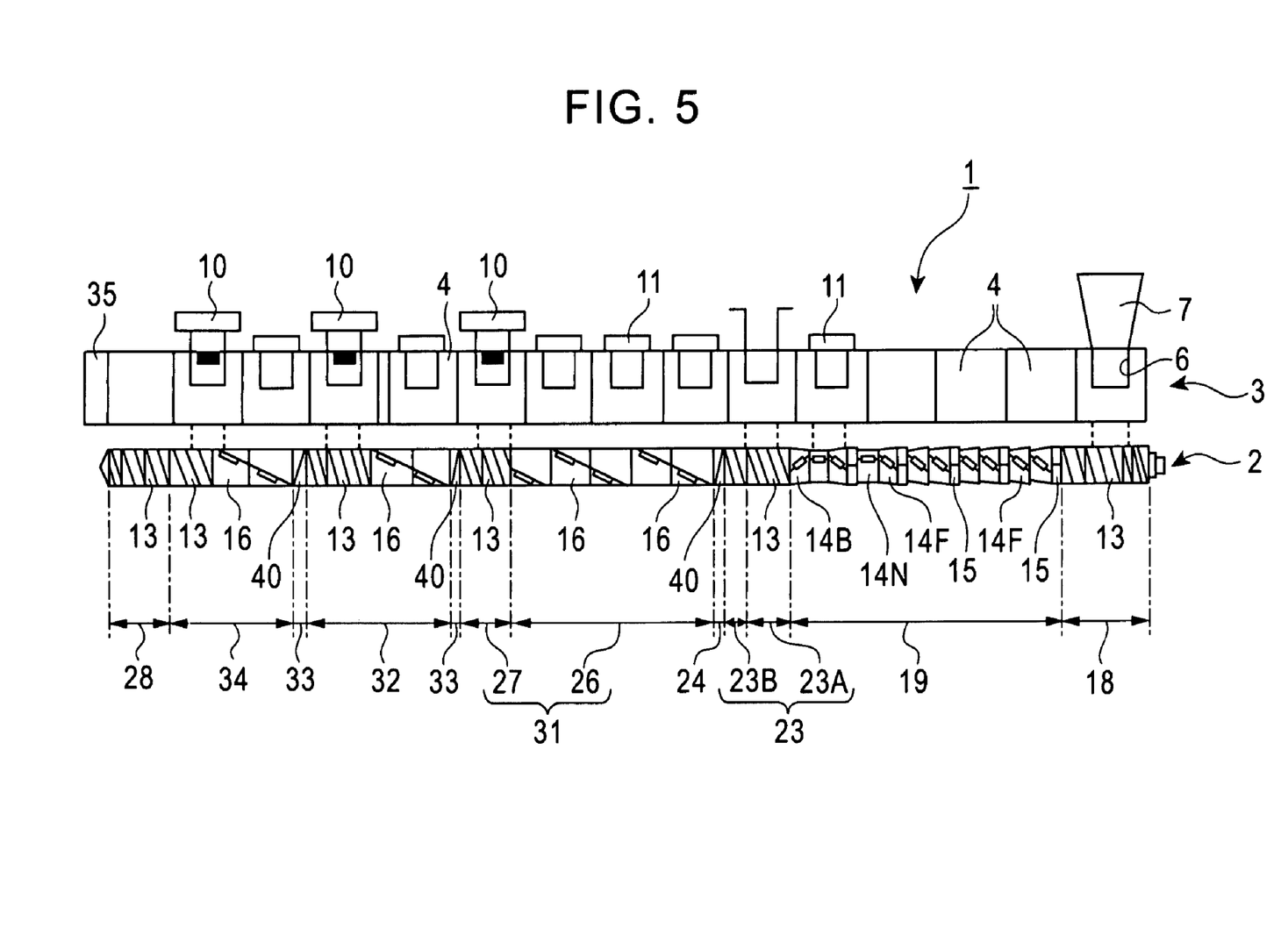
FIG. 5 is a schematic diagram of a twin screw extruder according to a second embodiment of the present invention.

FIG. 5 illustrates a twin screw extruder 1 according to a second embodiment of the present invention.

The extruder 1 according to the second embodiment is different from that of the first embodiment in that the kneading screws 2, 2 of the extruder 1 of the second embodiment are each provided with a plurality of devolatilization segment sections 31, 32, 34 and intermediate resistive sections (resistive elements) 33, 33.

Specifically, one of the intermediate resistive sections 33 includes a reverse-spiral screw segment 40 and is disposed adjacent to the downstream side of the first devolatilization section 31. The second devolatilization segment section 32 is disposed adjacent to the downstream side of this intermediate resistive section 33. The other intermediate resistive section 33 is disposed adjacent to the downstream side of the second devolatilization segment section 32. The third devolatilization segment section 34 is disposed adjacent to the downstream side of this intermediate resistive section 33. The second impregnation section 28 is disposed adjacent to the downstream side of the third devolatilization section 34. The second impregnation section 28 includes a group of screw segments 13 arranged in a manner such that the flight pitch is narrower towards the downstream side.

The devolatilization segment sections 31, 32, 34 have substantially the same structure as the devolatilization portion 25 according to the first embodiment, and are each provided with the vacuum vent 10. Thus, each of the devolatilization segment sections 31, 32, 34 performs a devolatilization process of the material 8 via the corresponding vacuum vent 10. On the other hand, each of the resistive sections 24, 33, 33 functions substantially in the same manner as the resistive sections 24, 35 according to the first embodiment. Specifically, each of the resistive sections 24, 33, 33 forces the material 8 to accumulate in the impregnation section disposed at the upstream side thereof so as to improve the sealing function.

The plurality of devolatilization sections 31, 32, 34 enables the kneading process of the material 8 to be performed sequentially while simultaneously ensuring that the devolatilization process is properly performed.

In the second embodiment, the length of the first devolatilization segment section 31 in each kneading screw 2 is L/D=10 (L indicating the length of the devolatilization section 26 and D indicating the diameter of the kneading chamber 5), whereas the length of each of the second and third devolatilization segment sections 32, 34 is L/D=4. The length of the first devolatilization section 31 is made larger for the purpose of improving the dispersal of additives in the material 8. On the other hand, if the main purpose is devolatilization, a satisfactory result can be attained by setting the L/D at about 2 to 10.

Furthermore, the resistive sections 24, 33, 33, 28 are disposed adjacent to the upstream and downstream sides of the devolatilization segment sections 31, 32, 34 in order to pressure-seal the devolatilization sections 31, 32, 34. Alternatively, the intermediate resistive sections 33, 33 may be omitted if necessary. In that case, the first impregnation section (downstream sub-section) 23B and the second impregnation section 28 may pressure-seal the first devolatilization segment section 31 to the third devolatilization segment section 34.

The present invention is not limited to the embodiments described above.

For example, the present invention may apply to extruders provided with triple-blade and single-blade segments. Moreover, the present invention may also apply to a single screw extruder.

Furthermore, in a case where a preliminarily kneaded and melted material 8 is to be inserted into the extruder 1 according to the present invention, the first kneading section 19 is not necessary.

Furthermore, although each of the resistive sections 24, 33 has the reverse-spiral screw segment 40, the resistive section 24 or 33 may have any type of segment as long as the segment applies a resistive force against the material 8 flowing downstream and thus forces the material 8 to accumulate so as to form an impregnation section. For example, the segment may be a reverse-spiral rotor segment 14. Furthermore, although the second resistive section 35 is preferably defined by a die, the second resistive section 35 may be any type of component as long as the component applies a resistive force against the material 8 flowing downstream. For example, the second resistive section 35 may be defined by an orifice, a transfer pipe, or a filtration unit.

Furthermore, although the twist angle of the flights 20 of the double-blade rotor segments 16 is set greater than 0° with respect to the axial direction of the kneading screws 2, 2, the twist angle of some of the flights 20 or the last set of flights 20 may be set at 0°.

First Embodiment

Referring to the twin screw extruder 1 according to the first embodiment, an example of an actual kneading operation of the material 8 will be described below.

The material 8 is composed of polyethylene resin, and is subject to devolatilization in the devolatilization portions 25 in order to remove the ethyl benzene and styrene monomer contained in the material 8. First, the polyethylene resin is plasticized and melted in the first kneading sections 19. Subsequently, in the devolatilization portions 25, while the polyethylene resin is transferred downstream, the volatile components, i.e. the ethyl benzene and styrene monomer, are vaporized and sucked into the vacuum vent 10 using a vacuum pump so as to be released outward from the barrel.

The overall length of each kneading screw 2 is L/D=50. The length of each devolatilization portion 25 is L/D=16. The diameter of each kneading screw 2 is 46 mm. The rotating speed of each kneading screw 2 is set at 400 rpm. The amount of extrusion of the material 8 is set at 100 kg/h. The pressure of the vacuum vent 10 is set at 0.5 kPa. Under these conditions, the devolatilizing operation of the polyethylene resin was performed.

The polyethylene resin discharged from the extruder 1 was granulated in a strand cut fashion, and the percentage content of the ethyl benzene and styrene monomer was measured. The percentage content of ethyl benzene was 0.054%, and the percentage content of styrene monomer was 0.0012%. Since the percentage content of ethyl benzene and the percentage content of styrene monomer in raw polyethylene resin are 0.98% and 0.042%, respectively, it was proven that an effective devolatilization operation was achieved.

Second Embodiment

The following is an example in which the material 8 is composed of polyethylene resin, and a compound mixed with carbon black is manufactured using the extruder 1 according to the second embodiment. Here, the diameter of each kneading screw 2 is 46 mm and the overall length thereof is L/D=54.

Each of the first kneading sections 19 includes the rotor segments 14 and the kneading disc segments 15 (having three kneading discs disposed at a phase angle of 45° with respect to each other), and performs a kneading process and dispersing and mixing processes of the carbon black with respect to the polyethylene resin.

The amount of extrusion of the material 8 is set at 150 kg/h. The rotating speed of each kneading screw 2 is set at 400 rpm. The temperature of the kneaded material 8 is set at 228° C. Under these conditions, the kneading operation was performed. As a result, the percentage content of styrene monomer was 0.001% or less, meaning that a compound having a low percentage content of volatile components and a high degree of dispersion of carbon was manufactured.

What is claimed is:

1. An extruder comprising:
    a barrel having a kneading chamber therein;
    a kneading screw comprising plural segments, said kneading screw extending through said kneading chamber in a rotatable fashion, said kneading screw being rotated so as to knead a material and to transfer the material from an upstream side of the extruder towards a downstream side of the extruder;
    a devolatilization segment section in said kneading screw, said devolatilization segment section being provided with a kneading flight twisted around said devolatilization segment section so as to transfer the material downstream, said kneading flight kneading the material while transferring the material downstream and separating a volatile component from the material;
    a feeding section disposed adjacent to a downstream side of said devolatilization segment section, said feeding section including a screw segment;
    a vacuum suction hole at a position corresponding to a position of said barrel where the feeding section is disposed, said vacuum suction hole communicating with a portion of said kneading chamber through which said devolatilization segment section extends; and
    impregnation sections disposed adjacent to an upstream side of said devolatilization segment section and to a downstream side of said feeding section, said impregnation sections for impregnating said kneading chamber with the material such that air cannot leak past the impregnation sections.

2. The extruder according to claim 1, wherein L/D is equal to 2 or more, D indicating a diameter of said kneading chamber and L indicating a length of the devolatilization segment section in a rotational-axis direction of said kneading screw.

3. The extruder according to claim 2, wherein said L/D is equal to 10 or more.

4. The extruder according to claim 1, wherein each impregnation section has a resistive element disposed adjacent to a downstream side thereof such that said resistive element applies a resistive force against a flow of the material being transferred downstream.

5. The extruder according to claim 4, wherein said resistive element includes a segment having a flight twisted in a direction for pushing the material upstream.

6. The extruder according to claim 4, wherein said resistive element includes a discharging member which discharges the material outward and generates a flow-path resistance when the material flows into said discharging member.

7. The extruder according to claim 1, wherein said devolatilization segment section includes a double-blade rotor segment comprising a pair of kneading flights provided in said at least one double-blade rotor segment, the pair of kneading flights being projected in opposite directions from each other with respect to a diameter direction of said at least one kneading screw, and wherein each of the kneading flights is provided with a low tip and a high tip for facilitating the separation of the volatile component, the low tip having a large tip clearance with respect to an inner surface of said at least one kneading chamber so as to enable a thin-film formation of the material on the inner surface, the high tip having a small tip clearance with respect to the inner surface of said at least one kneading chamber so that the thin film of the material is scraped off the inner surface by the high tip.

8. The extruder according to claim 7, wherein said kneading chamber comprises a pair of kneading chambers communicating with each other within said barrel, wherein a pair of said kneading screws respectively extending through the pair of kneading chambers in a rotatable fashion, said kneading screws being rotatable in the same direction and being meshed with each other.

9. The extruder according to claim 7, wherein the double-blade rotor segments in the devolatilization segment section are connected in a continuous manner such that side surfaces of the kneading flights of the adjacent rotor segments with respect to an axial direction of said kneading screw do not have a step therebetween.

10. The extruder according to claim 7, wherein a twist angle of each kneading flight of said double-blade rotor segment is set greater than 0° and equal to or smaller than 60° with respect to an axial direction of said kneading screw.

* * * * *